US005199876A

United States Patent [19]

Waldman

[11] Patent Number: 5,199,876

[45] Date of Patent: Apr. 6, 1993

[54] HAND REFLEXOLOGY GLOVE

[76] Inventor: Martin S. Waldman, P.O. Box 5473, Vandenberg, Calif. 93437

[21] Appl. No.: 938,280

[22] Filed: Aug. 31, 1992

Related U.S. Application Data

[63] Continuation-in-part of Ser. No. 756,072, Sep. 6, 1991.

[51] Int. Cl.[5] .......... G09B 23/28

[52] U.S. Cl. .......... 434/262; 2/159; 128/735; 606/204

[58] Field of Search .......... 434/262, 267, 233, 395; 2/159, 168, 160, 167, 169; 128/26, 907, 24.5, 67, 24 R, 735; 606/204, 189

[56] References Cited

U.S. PATENT DOCUMENTS

| | | | |
|---|---|---|---|
| 1,536,273 | 5/1925 | Schnee | 128/24.5 |
| 1,545,413 | 7/1925 | Elmvall | 128/24.5 |
| 2,657,394 | 11/1953 | Milton, Jr. et al. | 2/159 X |
| 3,028,857 | 4/1962 | Parker | 128/26 X |
| 3,595,225 | 7/1971 | Beeman | 606/204 X |
| 3,923,064 | 12/1975 | Leupold | 606/189 |
| 4,033,054 | 7/1977 | Fukuoka | 606/204 X |
| 4,073,296 | 2/1978 | McCall | 128/67 X |
| 4,319,574 | 3/1982 | Sun et al. | 606/204 |
| 4,508,119 | 4/1985 | Tukamoto | 606/204 X |
| 4,549,536 | 10/1985 | Varjabedian | 128/60 |
| 4,632,095 | 12/1986 | Libin | 128/60 X |
| 4,660,228 | 4/1987 | Ogawa et al. | 2/168 X |
| 4,694,831 | 9/1987 | Seltzer | 128/62 R |
| 4,751,750 | 7/1988 | Tepley . | |
| 4,759,718 | 7/1988 | Nobuta | 434/262 |
| 4,852,553 | 4/1989 | Voykin . | |
| 4,916,757 | 3/1990 | Berlin et al. | 2/168 X |
| 5,067,256 | 11/1991 | Darby | 606/204 X |
| 5,070,862 | 12/1991 | Berlant | 128/420.5 X |
| 5,094,227 | 3/1992 | Eglauf et al. | 128/60 |

*Primary Examiner*—Richard J. Apley
*Assistant Examiner*—Karen A. Jalbert

[57] ABSTRACT

As an improvement to the utility and techniques of hand reflexology, a hand reflexology glove (54) comprised of a pliant plastic material is intended for placement upon a hand (14). A hand reflexology zone morphological map (50) along with a plurality of reflex zone lines (24L, 26, 28, 30 and 32) provide an accurate hand reflexology guidance interface during a reflexology treatment (60) being performed by a hand (34). Reflexology glove (54) directly overlays actual organ and bodily function reflex receptor zone points naturally occurring in hand (14), allowing an individual to instantly and accurately access any hand reflex receptor zone of interest.

12 Claims, 4 Drawing Sheets

HAND REFLEXOLOGY GLOVE

BACKGROUND—CROSS REFERENCE TO RELATED APPLICATIONS

This application is a continuation-in-part of Ser. No. 07/756,072 filed Sep. 6, 1991 pending. The contents thereof are incorporated by reference herein.

I also have on file at the U.S. Patent Office the following Disclosure Document outlining a prototype of this invention: #282798 dated May 28, 1991, titled 'REFLEXOLOGY ZONE MAP, IN THE FORM OF A GLOVE OR A SOCK (REFLEXOLOGY GLOVE/-SOCK)'.

BACKGROUND—FIELD OF INVENTION

This invention relates to a glove, specifically to a novel manifestation of a hand reflexology zone morphological map in the form of a therapeutic glove.

BACKGROUND—DESCRIPTION OF PRIOR ART

Simply stated, the science of hand reflexology is the process of directly stimulating via direct pressure, the reflex receptor points in the hand which directly correspond to the body's internal organs and functions. The body is divided into ten zones of jurisdiction, each zone containing its corresponding organs with their reflex counterpart in the hand.

The knowledge and use of hand reflexology predates modern times, and exposed its beginnings in the societies of Egypt and China, well over 5,000 years ago. In 1580 AD, the Western culture was formally introduced to hand reflexology via the published works of two prominent European physicians. The year 1913 ushered in the foundational modern day hand reflexology works of Dr. William Fitzgerald, an ear, nose, and throat specialist at St. Francis Hospital in Hartford Conn. Dr. Fitzgerald's scientific and empirical methods formed the basis and understandings upon which modern day hand reflexology methods are employed.

By topographically illustrating the modern day knowledge of hand reflexology upon a pliant plastic material comprising a glove, one arrives at this invention; which is a detailed, reliable, and highly useful hand reflexology zone morphological zone map in the form of a therapeutic glove. This zone map instantly aligns on, and directly overlays the naturally occurring reflex zones in the hand to be stimulated by direct pressure thru the pliant plastic material forming the hand reflexology glove.

This pliant plastic material enables a lone practitioner to benefit from a deep, focused, and penetrating self application of hand reflexology massage, by effectually shielding the distracting effects of skin surface friction, and the skin's surface sense of touch with respect to the hands. To accomplish this effectual shielding, the pliant plastic material exhibits the following qualities in combination with the morphological map of the hand reflexology glove:

1) Translation of previously bare-handed skin-to-skin contact friction into cumulative thermodynamic heating of the hand enclosed by the glove. This heating allows for a deeper application of focused hand reflexology massage than possible between bare hands.

2) The capability to encompass the gloved hand in varied temperature environments such as hot/cold water for applying heating/cooling cycles to enhance the depth, focus, and penetration of the hand reflexology treatment.

3) Promoting degrees of perspiration on the gloved hand, which in turn enables the self user to better feel below the surface, and vary the focal depth of the hand reflexology input simulation.

4) Containment of special massage lotions, powders, or other substances a self user may wish to apply on the gloved hand. These substances enhance the effectivity of the focus, depth, and penetration of the hand reflexology massage, in accordance with the modern day methods of hand reflexology.

To the best of my knowledge, there is no existing prior art regarding a hand reflexology zone morphological map in the form of a therapeutic glove. There is however, an invention by Nobuta, U.S. Pat. No. 4,759,718 which describes a wear having cure targets visually placed in accordance with the teachings of oriental medicine. Nobuta's wear essentially comprises an array of 'tattoos on cloth', with the garment itself not serving any purpose aside from being a vehicle for visually identifying the location of target zones. In contrast, my invention utilizes the concept of visually illustrated target zones in combination with the thermodynamic/-containment properties of the glove material itself. This new combination allows a user to attain the most complete self application of the deep, focused, and penetrating hand reflexology massage possible.

In addition to Nobuta's invention, there exists numerous technical books, charts, and other instructional documentation providing information regarding the methods and benefits of hand reflexology. While useful to medically inclined individuals, the layman finds that this information is difficult to assimilate and use. As a result, the application and benefits of hand reflexology are generally unknown to the mass population.

In addition to the disadvantages inherent with the present complex vehicles of hand reflexology information, the lack of of a simple approach to this science also results in the following disadvantages:

(a) No simplified instruction systems exist for a layman to effectively and instantly understand the fundamentals and basic applications of the hand reflexology techniques.

(b) The layman has found it difficult to correlate, integrate, and use the various technical hand reflexology information available to stimulate hand reflexes for promoting healing in a practical manner.

(c) The present sources of information about hand reflexology do not serve to inspire a common individual to further his or her study of the hand reflexology field and utilize its benefits on a daily basis.

(d) The mass public is generally devoid of the concept that the body's inherent intelligence system for systematic healing can be activated by stimulating reflexes in the hands.

(e) Our culture has lost touch with the bodies silent language which signals advance warnings of impending illness via the reflexes in the hands.

(f) Our culture depends enormously upon drugs to silence symptoms of disease which in turn disable hand reflex indicators.

(g) Hand reflexology training methods available today are difficult to memorize, and require many hours to master.

(h) The location of hand reflex zones require guesswork by the layman when attempting to correlate chart information to actual reflex zone locations in the hands.

(i) Self application of hand reflexology directly on the skin surface tends to be conflictual, confusing, and distracting due to the sensitivity and texture of the skin surface itself.

All these complexities and shortcomings possibly explain why the science and benefits of hand reflexology are largely unknown outside professional healthcare circles. It is clearly evident that the mass public never has had the opportunity to reap the benefits of a practical, simple to use, instructional vehicle for the utilization of hand reflexology zone therapy.

OBJECTS AND ADVANTAGES

Accordingly, the main objects and advantages of this invention are that it be smartly designed to safely, efficiently, and inexpensively perform the function of a morphological roadmap for a self-user to instantly indicate and access the locations of all important reflex zone areas in the hands.

In addition to these clear advantages of my interpretation of the most practical form a hand reflexology zone morphological map should take the form of, this invention also benefits from the following important advantages:

(a) The direct presentation of pertinent hand reflex zone locations on the glove of this invention allows for an instant accurate understanding of hand reflexology techniques by a layman.

(b) The hand reflexology glove integrates all necessary technical hand reflexology information into a single usable device for the instant application of stimulating hand reflexes to promote healing.

(c) The hand reflexology glove provides the layman with an instantly useful introduction to the benefits of hand reflexology, and serves as a springboard for investigating the science further if desired.

(d) The hand reflexology glove simply demonstrates and proves to an individual that the hand reflex zone mechanisms and processes are indicative of the body's inherent intelligence system for systematic healing.

(e) Practice of hand reflex zone therapy with the reflexology glove quickly trains an individual to be aware of the messages sent to the reflexes in the hands, which may be signaling the possibility of an impending illness.

(f) Practice of hand reflex zone therapy with the reflexology glove will teach the common individual to listen to the symptoms of disease instead of ignoring them by turning to artificial drugs and pain killers.

(g) The hand reflexology glove allows for instant use without memorization of the hand reflex zone locations.

(h) The simple presentation of all pertinent hand reflexology information on the hand reflexology glove eliminates the need for cross referencing of charts, and guesswork as to the precise location of reflex zones in the hands.

(i) The pliant plastic material comprising the hand reflexology glove acts as an artificial skin surface and texture to restructure the practitioner's apparent surface skin sensitivity, allowing the individual to efficiently focus hand reflexology pressure below the surface.

Further objects and advantages of this invention are to provide a layman or professional with a simplified tool for directly accessing any hand reflex zone of concern where calcium crystal deposits have occurred, signaling the possibility that a weakness may be present in the organ which corresponds to that particular hand reflex. Precise application of pressure on these crystalline deposits as directed by the morphological map on the hand reflexology glove will breakdown these crystalline formations, which in turn will aid circulation, and also send a corresponding healing signal to the corresponding organs of interest.

These, and all of the above positive factors clearly define an invention which brings about the concept of personal responsibility for the well being of their organism in a direct participatory manner. The lightweight and portable nature of this invention further enhances the options for use practically anywhere, without the need for supplementary books and charts. Still further objects and advantages will become apparent from a consideration of the ensuing description and drawings.

DRAWING FIGURES

All drawings illustrating this invention portray it as being constructed of an opaque, pliant plastic material. A description of these drawings follow:

REFERENCE NUMERALS IN DRAWINGS

Figure 1:
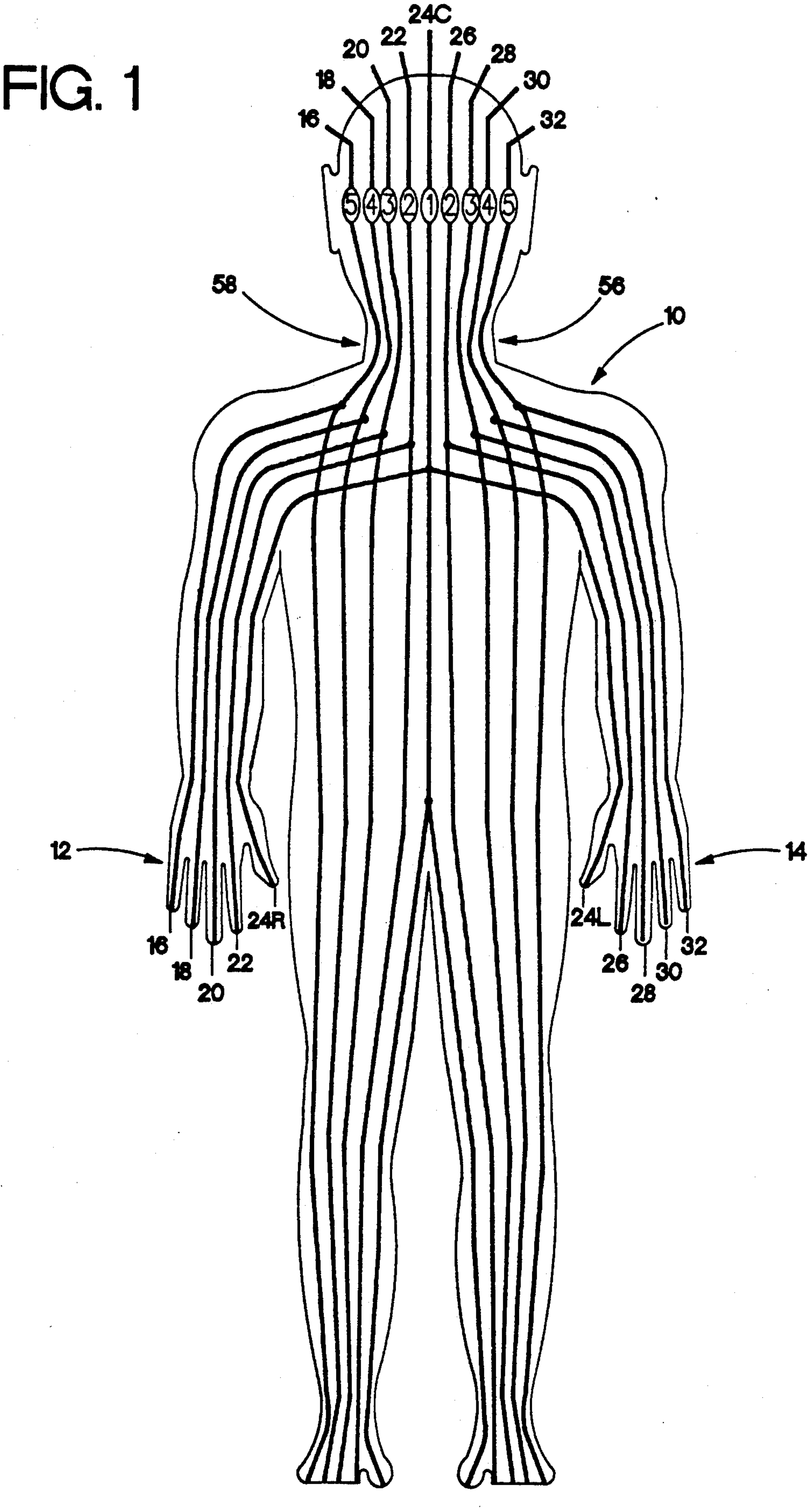
FIG. 1 is a perspective front view of the body illustrating how it is divided into ten contiguous zones.

10 human body
12 right hand
14 left hand
16 zone line 5 of right body side
18 zone line 4 of right body side
20 zone line 3 of right body side
22 zone line 2 of right body side
24R zone line 1 of right body side
24L zone line 1 of left body side
24C center zone line 1 of the body
26 zone line 2 of left body side
28 zone line 3 of left body side
30 zone line 4 of left body side
32 zone line 5 of left body side
34 hand applying reflex zone pressure
36 right hand reflexology glove exterior
38 opening of right hand reflexology glove
40 right hand reflexology glove interior surface area
42 left hand reflexology glove exterior
44 opening of left hand reflexology glove
46 left hand reflexology glove interior surface area
48 right hand reflexology glove morphological map
50 left hand reflexology glove morphological map
52 right hand reflexology glove comprised of a pliant plastic material
54 left hand reflexology glove comprised of a pliant plastic material
56 left half of human body
58 right half of human body 60 a hand reflexology treatment
62 right hand reflexology glove interior volume
64 left hand reflexology glove interior volume

DESCRIPTION—FIGS. 1 to 4

Figure 2:
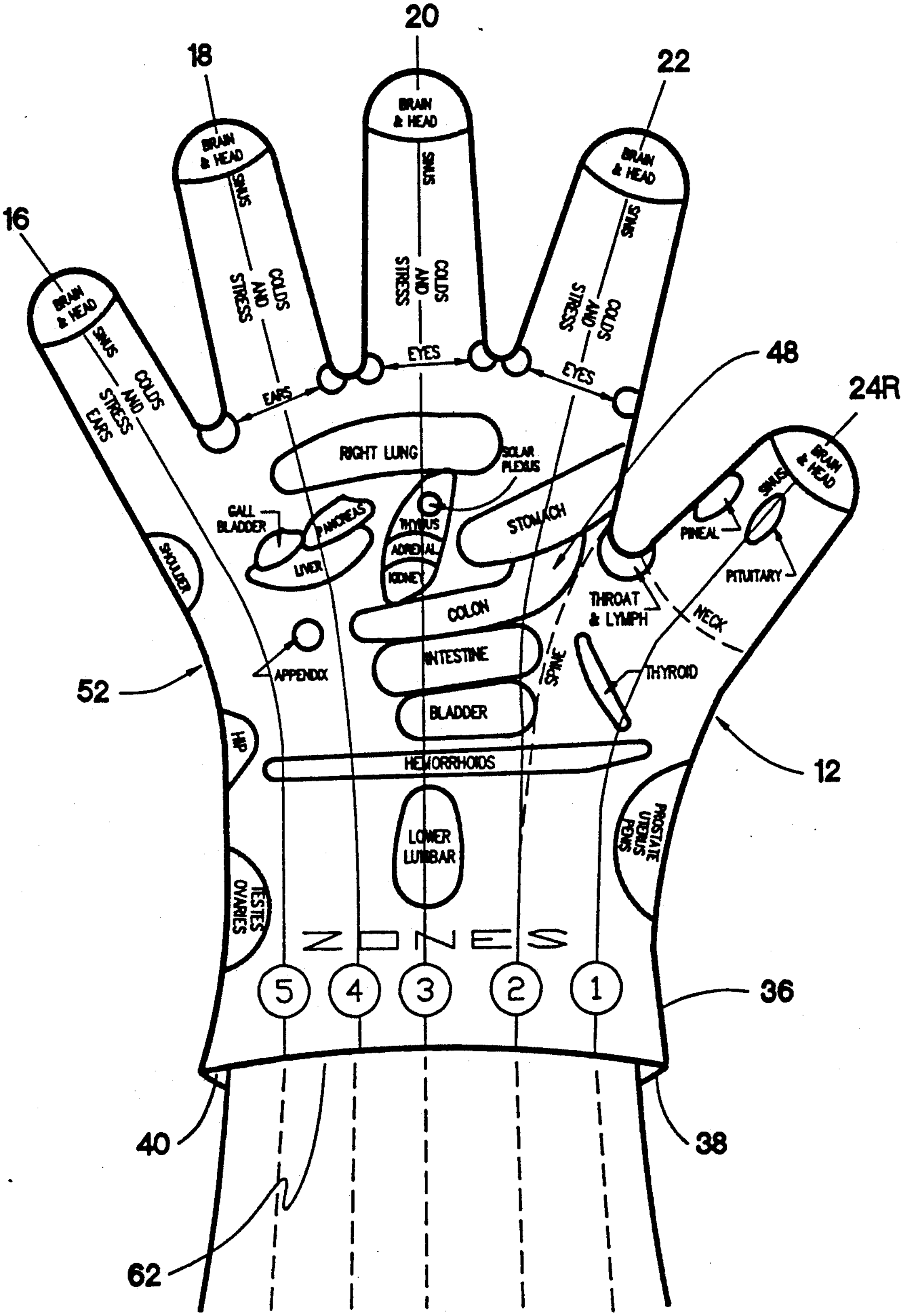
FIG. 2 is an enlargement of the right hand of FIG. 1, covered by a reflexology glove illustrating the hand reflex morphological map and reflex zone lines.

A hand reflexology glove 52 as illustrated in FIG. 2 consists of an exterior surface 36, an interior volume 62, an interior surface area 40, an opening 38, a morphological zone map 48, and a plurality of reflex zone lines 16, 18, 20, 22 and 24R. Interior volume 62 of reflexology glove 52 is defined as the volume which removably receives a right hand 12 in selective direct surrounding contact with interior surface area 40. Exterior surface area 36 of glove 52 is defined as the surface area having morphological zone map 48, and reflex zone lines 16, 18, 20, 22 and 24R illustrated thereon. Opening 38 is defined as the access location through which interior surface area 40, and interior volume 62 is accessed by right hand 12.

Figure 3:
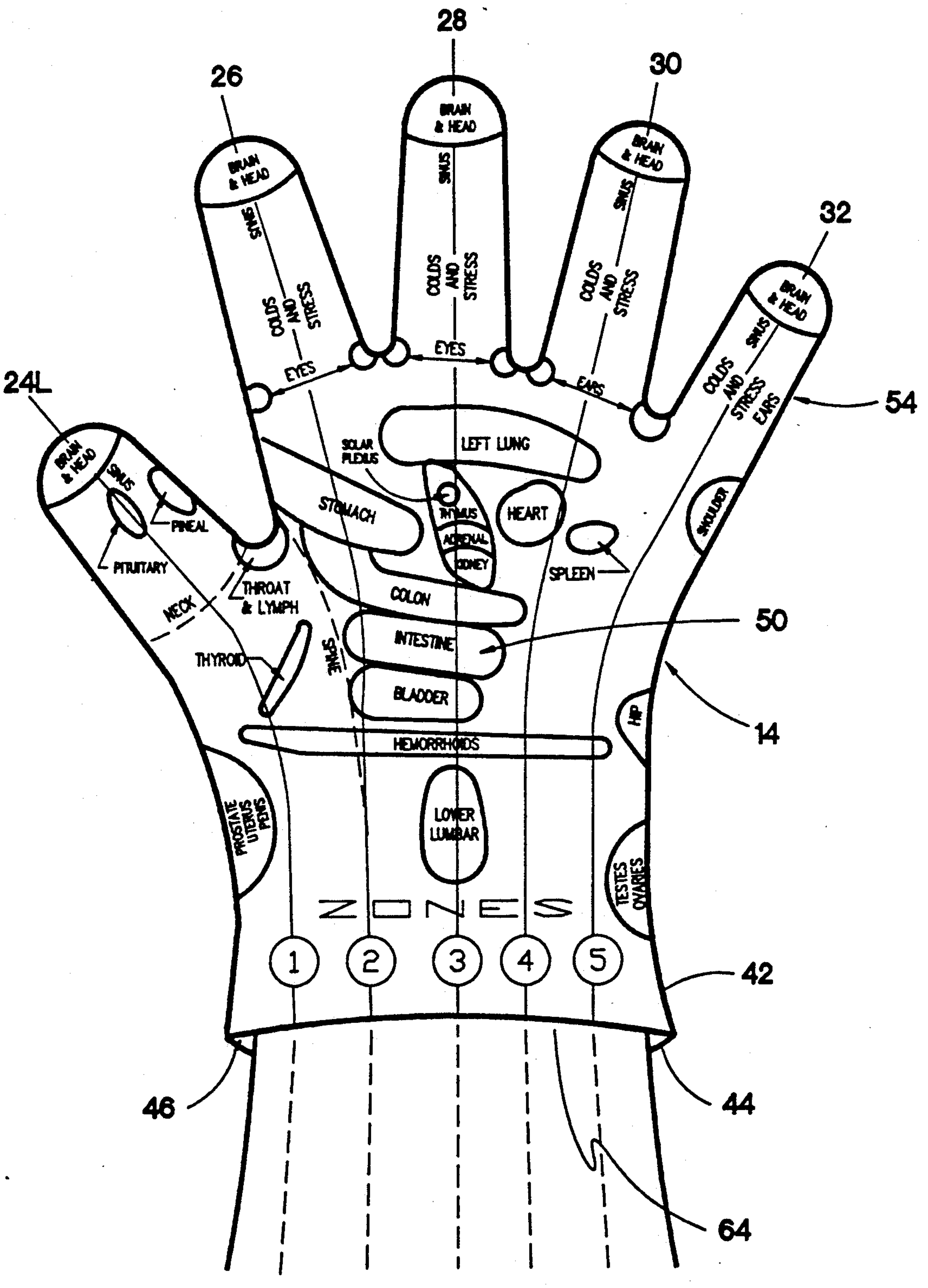
FIG. 3 is an enlargement of the left hand of FIG. 1, covered by a reflexology glove illustrating the hand reflex morphological map and reflex zone lines.

A hand reflexology glove 54 as illustrated in FIG. 3 consists of an exterior surface 42, an interior volume 64, an interior surface area 46, an opening 44, a morphological zone map 50, and a plurality of reflex zone lines 24L, 26, 28, 30 and 32. Interior volume 64 of reflexology glove 54 is defined as the volume which removably receives a left hand 14 in selective direct surrounding contact with interior surface area 46. Exterior surface area 42 of reflexology glove 54 is defined as the surface area having morphological zone map 50, and reflex zone lines 24L, 26, 28, 30 and 32 illustrated thereon. Opening 44 is defined as the access location through which interior surface area 46, and interior volume 64 is accessed by left hand 14.

A complete description of hand reflexology gloves 52 and 54 as described by FIGS. 1-4 is as follows: A human body 10 shown in FIG. 1, is illustrated as having ten contiguous reflex zone lines contained within the borders of zone lines 16, 18, 20, 22, 26, 28, 30, 32 and a center reflex zone line 24C. Reflex zone line 24C contiguously splits into reflex zone line 24R as shown by FIGS. 1 and 2. Reflex zone line 24C also contiguously splits into reflex zone line 24L as shown by FIGS. 1 and 3. Left hand 14 contains naturally occurring reflex receptor points which correspond to all organs contained within a left side 56 of human body 10. Right hand 12 contains naturally occurring reflex receptor points which correspond to all organs contained within a right side 58 of human body 10.

Figure 4:
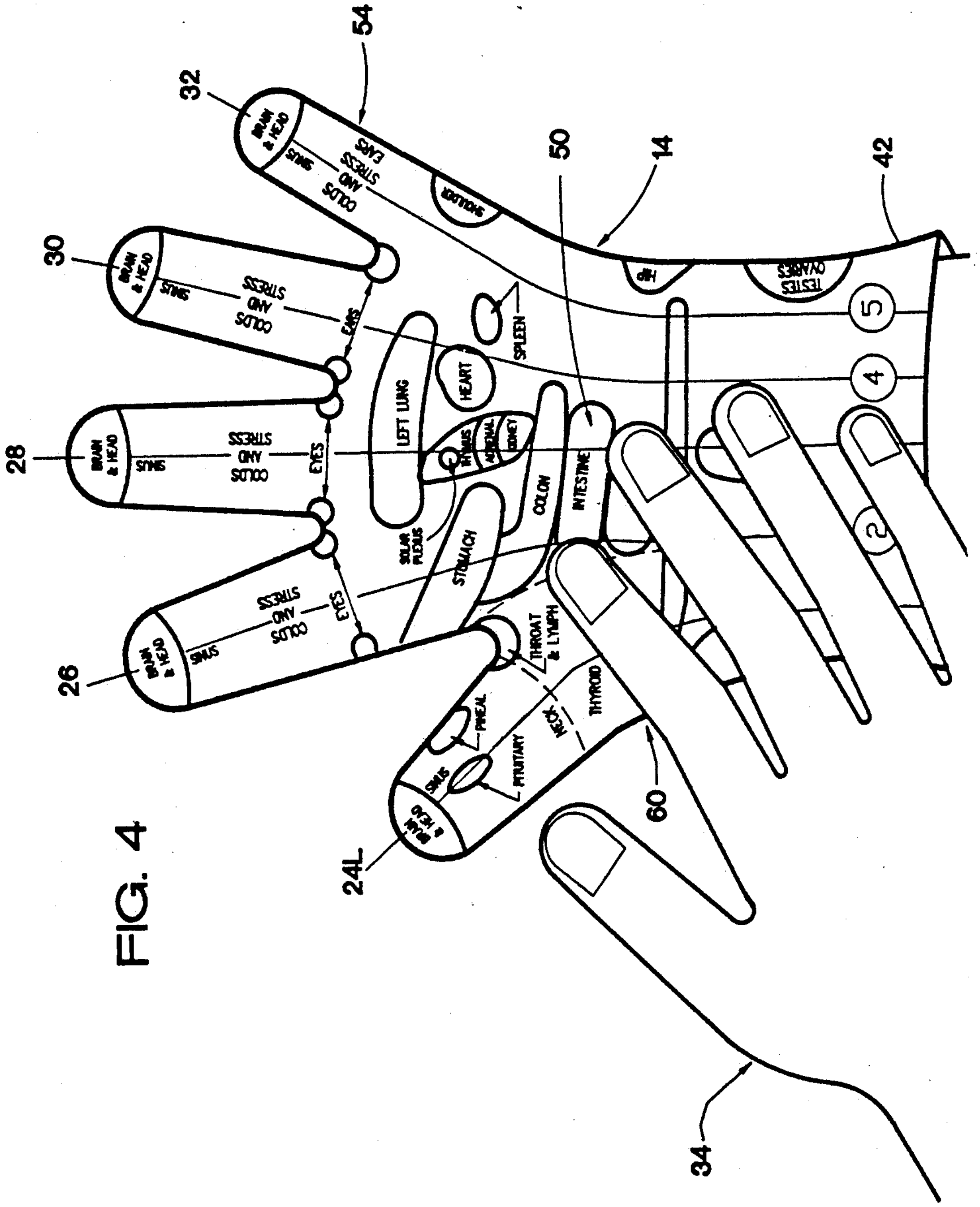
FIG. 4 is a dynamic three dimensional representation of how the left hand of FIG. 3 is overlaid with the reflexology glove of this invention indicating the reflex zones and lines. An un-gloved right hand is applying reflex zone therapy on the left gloved hand which instantly displays the location of all common reflex zones and lines.

Left hand 14 plainly visible in FIG. 1 is shown in FIGS. 3 and 4 covered by reflexology glove exterior 42 of reflexology glove 54. Hand 14 of FIG. 1 is directly inserted into reflexology glove opening 44 of FIG. 3 and fills reflexology glove interior volume 64. Reflexology zone lines 24L, 26, 28, 30 and 32 along with morphological zone map 50 overlay actual naturally occurring organ reflex receptor zone points in hand 14 as illustrated by morphological zone map 50.

Right hand 12 plainly visible in FIG. 1 is shown in FIG. 2 covered by reflexology glove exterior 36 of reflexology glove 52. Hand 12 of FIG. 1 is directly inserted into reflexology glove opening 38 of FIG. 2 and fills reflexology glove interior volume 62. Reflexology zone lines 24R, 22, 20, 18 and 16 along with morphological zone map 48 overlays naturally occurring organ reflex receptor zone points in hand 12 as illustrated by morphological zone map 48.

A hand 34 of FIG. 4 selectively inputs a reflex zone pressure 60 thru pliant plastic material comprising glove 54 into a choice of reflex zones 24L, 26, 28, 30 and 32 of hand 14 in accordance with morphological map 50. Morphological map 50 directly overlays naturally occurring organ reflex receptor zone points in hand 14 as illustrated by morphological zone map 50.

From the description above, a number of advantages of this hand reflexology glove become evident:

(a) The morphological zone map and reflex zone line placement directly on a glove affords unquestionable simplicity for a layman's understanding of hand reflexology.

(b) Placing the reflexology glove on the hand provides an instant accurate guide for accessing all naturally occurring organ reflex receptor zone points in the hand.

(c) The simplicity of use inherent with the hand reflexology glove allows a user to immediately benefit from hand reflexology, and can serve to inspire that particular individual to explore the science even further if desired.

(d) The direct body feedback one can quickly become in touch with by practicing hand reflexology with the reflexology glove allows for an individual to consciously participate and assist with the body's healing system.

(e) The hand reflexology glove trains an individual to notice how the naturally occurring organ reflex receptor zone points in the hands serve as monitoring points for indicating the status of body health.

(f) Regular use of the hand reflexology glove illustrates to a user how the beneficial rewards of hand reflexology can supersede the temporary relief afforded by artificial drugs and pain killers.

(g) The hand reflexology glove affords the user with clear and precise visual information instantly indicating all hand reflex zone information without memorization.

(h) The accurately identified reflex zones and morphological map on the hand reflexology glove instantly align with and directly interface with the naturally occurring organ reflex receptor zone points in the hands via overlay, allowing the user to perform hand reflexology without the need for guesswork in any form.

(i) The pliant plastic material comprising the hand reflexology glove allows an individual to focus their application of hand reflexology pressure at various levels from the surface to the bone area.

OPERATION—FIGS. 1-4

Hand reflexology glove 52 is designed to be conventionally placed on right hand 12 of human body 10 as detailed in FIG. 2. Opening 38 removably receives hand 12, allowing interior volume 62 to be occupied by hand 12. When securely placed on hand 12, reflex zone lines 16, 18, 20, 22 and 24R along with morphological zone map 48 accurately overlays and aligns with actual organ reflex receptor points naturally occurring in hand 12.

Reflexology glove 54 is designed to be conventionally placed on left hand 14 of human body 10 as detailed in FIGS. 3 and 4. Opening 44 removably receives hand 14 allowing interior volume 64 to be occupied by hand 14. When securely placed on hand 14, reflex zone lines 24L, 26, 28, 30 and 32 along with morphological zone map 50 accurately overlays and aligns with actual organ reflex receptor points naturally occurring in hand 14.

Hand reflexology treatment 60 depicted in FIG. 4 illustrates hand 34 applying reflex zone pressure upon hand 14 thru pliant plastic material comprising reflexology glove 54. Morphological map 50 along with reflex zone lines 24L, 26, 28, 30 and 32 provide an accurate hand reflexology guidance interface by directly overlaying actual organ reflex receptor zone points naturally existing in hand 14. Assumed but not illustrated is how hand reflexology treatment 60 can be equally and similarly applied to hand 12 of FIG. 2.

Reflexology glove 52 of FIG. 2 is designed to be conventionally removed like a standard glove from hand 12. Similarly, reflexology glove 54 of FIGS. 3 and 4 is designed to be conventionally removed like a standard glove from hand 14. Reflexology gloves 52 and 54 are durably designed for repeated use as illustrated by reflexology treatment 60 depicted in FIG. 4.

SUMMARY, RAMIFICATIONS, AND SCOPE

Accordingly, the reader will see that the hand reflexology zone morphological map in the form of a therapeutic glove defined by this invention is the embodiment of virtues which serve to make the hand reflexology glove a worthwhile, inexpensive purchase for the mass public. Scientific and medical studies relating hand reflexology zone treatment to actual healing and maintenance of health is firmly founded and documented. With the advent of the hand reflexology glove into the marketplace, the layman will no longer be confused and discouraged by the complex and highly technical information presently available on the subject of hand reflexology. The guesswork involved with the complexities of correlating the information of a hand reflexology chart and text with the human hand and body will be a thing of the past. With this invention, an individual will have a simple, coherent, instant, and extremely usable system for integrating the health benefits of hand reflexology into their daily lives. Furthermore, the reflexology glove has the additional advantages in that:

it permits a layman to quickly understand the principles and applications of hand reflexology.

it allows the student of hand reflexology the capability of instantly and accurately identifying all important reflex zone receptor points in the hand.

it enables a user to quickly and effectively apply the hand reflexology techniques in such a simple manner, that when its benefits soon become apparent, the individual will be well suited for further knowledgeable explorations of the topic if desired.

it teaches the individual how to accept the fact that they can consciously participate and assist with their body's healing system.

it teaches the student of hand reflexology how to consciously tune into the body's health and well being status indicators.

it proves to an individual that they can foster their health and well being without artificial substances.

it allows a novice to effectively apply and benefit from hand reflexology without memorizing complex information.

it enables a lay individual to perform an accurate application of hand reflex zone stimulation without any guesswork as to the location of the reflex receptor zone input area.

it enables any individual from the novice to expert, the most penetrating, focused, deep, and complete hand reflexology treatment possible.

Although the description above contains many specifications, these should not be construed as limiting the scope of the invention, but as merely providing illustrations of the presently preferred embodiment of this invention. For example, the reflex zone lines and morphological map could be illustrated on a single reversible glove suited for use on either hand, with reflex zone morphological maps and zone lines simultaneously overlaying naturally occurring reflex zones on the top and bottom of a hand. Also, the hand reflexology glove can be manufactured in an array of materials ranging from clear to opaque, and of any combination of colors, and may even utilize a liner for sanitary control.

Thus the scope of the invention should be determined by the appended claims and their legal equivalents.

I claim:

1. A hand reflexology zone morphological map in the form of a therapeutic glove comprised of:

a pliant plastic material for selectively covering a hand, resulting in an encompassing skin surface and texture of said hand to be overlaid with an artificial skin surface and texture means arranged of said pliant plastic material, forming an interface cushion over said hand for purposes of selectively conveying an associated hand reflexology input stimulation into said hand, whereby said artificial skin surface and texture means facilitates variations in focal depth of said reflexology input stimulation into said hand by altering sensitivity of said skin surface;

said pliant plastic material forming an interior volume, an interior surface area, a glove interior volume and interior surface area access means for removably receiving said hand into said interior volume allowing said interior surface area to directly interface with said hand;

an exterior surface area illustrated with a hand pattern reflexology receptor zone identification means consisting of a reflexology zone morphological map designed to directly overlay an array of reflex receptor zones in said hand for accurately targeting said reflexology input stimulation into said hand whereby an individual can instantly access any reflex receptor zone of interest to apply the benefits of hand reflexology as required.

2. A glove as claimed in claim 1 wherein said morphological map is illustrated on a left handed glove.

3. A glove as claimed in claim 2 wherein said glove is of a conventional hand shape with five distinct and separate finger receptacles.

4. A glove as claimed in claim 2 wherein said glove is of a conventional mitt shape with zero to five distinct and separate finger receptacles.

5. A glove as claimed in claim 1 wherein said morphological map is illustrated on a right handed glove.

6. A glove as claimed in claim 5 wherein said glove is of a conventional hand shape with five distinct and separate finger receptacles.

7. A glove as claimed in claim 5 wherein said glove is of a conventional mitt shape with zero to five distinct and separate finger receptacles.

8. A hand reflexology zone morphological map in the form of a therapeutic glove comprised of:

a pliant plastic material for selectively covering a right hand and a left hand, resulting in an encompassing skin surface and texture of either of the hands being overlaid with an artificial skin surface and texture means arranged of said pliant plastic material, forming an interface cushion over said skin surface for purposes of selectively conveying an associated hand reflexology input stimulation into either of the hands, whereby said artificial skin surface and texture means facilitates variations in focal depth of said reflexology input stimulation into either of the hands by altering sensitivity of said skin surface;

said pliant plastic material forming an interior volume, an interior surface area, a glove interior volume and interior surface area access means for removably receiving either of the hands into said interior volume allowing said interior surface area to directly interface with either said hand;

an exterior surface area illustrated with a left hand and a right hand pattern reflexology receptor zone identification means consisting of a reflexology zone morphological map designed to directly overlay an array of reflex receptor zones in either of the hands to accurately targeting said reflexology input stimulation into either of the hands whereby an individual can instantly access any reflex receptor zone of interest to apply the benefits of hand reflexology as required.

9. A glove as claimed in claim 8 wherein said left hand and right hand reflex receptor zone identification means are illustrated independently and simultaneously on opposing sides of said exterior surface area of said glove.

10. A glove as claimed in claim 9 wherein said glove is of a conventional hand shape with five distinct and separate finger receptacles.

11. A glove as claimed in claim 9 wherein said glove is of a conventional mitt shape with zero to five distinct and separate finger receptacles.

12. An improved method for an individual to self-apply a dynamic hand reflexology input stimulation by:

a. placing a pliant plastic material glove on either hand, resulting in a gloved hand, said glove having an interior surface area, an exterior surface area, and an array of reflex zone morphological maps illustrated upon said exterior surface area, b. an ungloved hand of said individual inputting said dynamic hand reflexology input stimulation thru said glove upon said gloved hand in accordance with guidance provided by said array of reflex zone morphological maps, said glove providing an environmental interface barrier, and effectually shielding said gloved hand's skin surface sense of touch and frictional sensitivity, c. said gloved hand interfacing with said glove interior surface area, wherein said pliant plastic material facilitates thermodynamic heating, and prompts perspiration of said gloved hand in association with said dynamic hand reflexology input stimulation to enhance depth, focus, and penetration of said hand reflexology input stimulation, whereby an individual can self-apply the most beneficial application of hand reflexology massage possible in accordance with the modern day knowledge of hand reflexology.

* * * * *